United States Patent [19]

Yamagata

[11] Patent Number: 5,142,423
[45] Date of Patent: Aug. 25, 1992

[54] RECORDING AND REPRODUCING APPARATUS

[75] Inventor: Shigeo Yamagata, Kanagawa, Japan

[73] Assignee: Canon Kabushiki Kaisha, Tokyo, Japan

[21] Appl. No.: 807,947

[22] Filed: Dec. 10, 1991

Related U.S. Application Data

[63] Continuation of Ser. No. 682,398, Apr. 5, 1991, abandoned, which is a continuation of Ser. No. 532,116, May 31, 1990, abandoned, which is a continuation of Ser. No. 289,446, Dec. 20, 1988, abandoned, which is a continuation of Ser. No. 34,404, Apr. 3, 1987, abandoned.

[30] Foreign Application Priority Data

Apr. 9, 1986 [JP] Japan .................................. 61-81541

[51] Int. Cl.⁵ ...................... G11B 5/03; G11B 21/08
[52] U.S. Cl. .................................. 360/66; 360/78.08
[58] Field of Search ............................ 360/66, 78.08

[56] References Cited

U.S. PATENT DOCUMENTS 4,085,427 4/1978 Dunn ........................................ 360/77
4,573,087 2/1986 Tezuka et al. ......................... 360/60

FOREIGN PATENT DOCUMENTS 3440155 5/1985 Fed. Rep. of Germany ........ 360/57

Primary Examiner—Vincent P. Canney
Attorney, Agent, or Firm—Robin, Blecker, Daley & Driscoll

[57] ABSTRACT

Recording and reproducing apparatus for recording and reproducing one field or a plurality of fields of recorded signals in a predetermined track position of a disc-type recording medium comprises an erasing circuit to erase the recorded signals recorded on the track, a tracking fine control mechanism for fine adjustment of a head arranged nearly opposite to the track, and an erasure control circuit to cause the erasing circuit to execute a predetermined erasing operation to erase the recorded signals on the track on a basis of the head position after the tracking fine control mechanism executes the fine adjustment of tracking. The erasure control circuit is designed to execute the erasing operation by the erasing circuit after executing the tracking fine control and displaying the recorded signals on a reproducing monitor for a predetermined time, in order to erase the predetermined recorded signals on the track without mis-erasure.

19 Claims, 6 Drawing Sheets

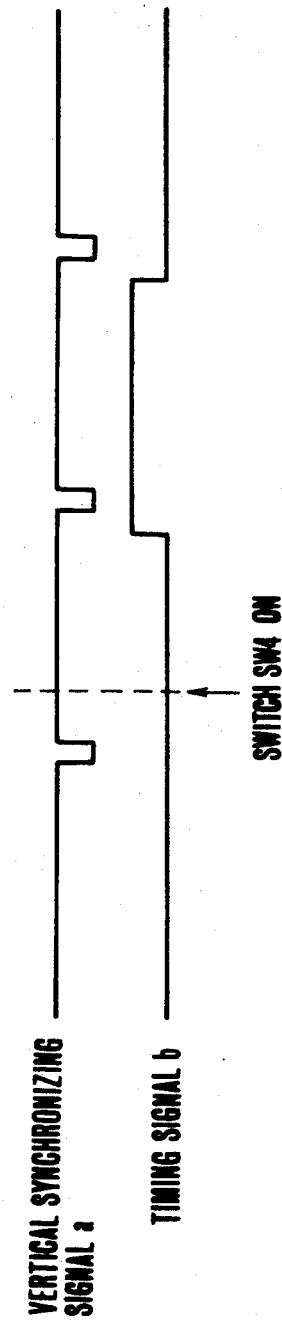

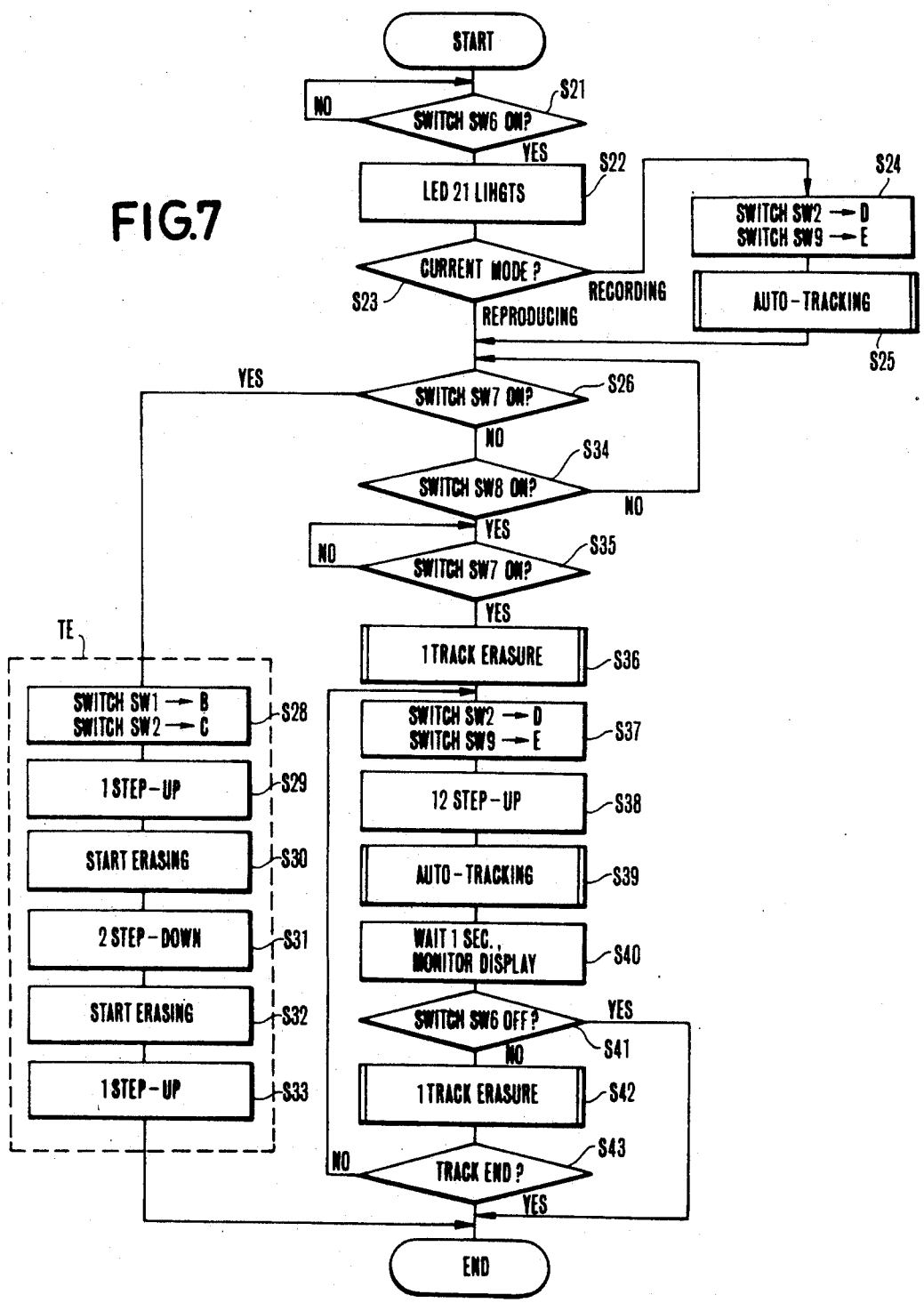

RECORDING AND REPRODUCING APPARATUS

This is a continuation application under 37 CFR 1.62 of prior application Ser. No. 682,398, filed Apr. 6, 1991, which is a continuation application under 37 CFR 1.62 of prior application Ser. No. 532,116 filed May 31, 1990, which is a continuation of Ser. No. 289,446, filed Dec. 20, 1988, which is a continuation of Ser. No. 034,404, filed Apr. 3, 1987, all 07 series; and now all abandoned.

BACKGROUND OF THE INVENTION

1. Field of the Invention

This invention relates to a recording and reproducing apparatus for recording and reproducing video signals generally, and more particularly to an improvement of a video signal erasing means for erasing the recorded video signals on a track formed beforehand in a magnetic disc.

2. Description of the Related Art

In this type of apparatus, the erasing processing to erase the recorded video signals on a track on a magnetic disc has been accomplished by overlapping a new erasing signal on the video signals to be erased on the track.

In this conventional apparatus, however, in the case when the track position accessed by reproducing head deviates from the absolute track position recorded, the signal portion on the deviated part of the track is not erased in execution of erasing, resulting in mis-erasure.

To compensate the track deviation, it has been considered that before execution of erasing, the head position is moved by an estimated deviation of the track position recorded from that accessed by the reproducing head. However, it is usually difficult to estimate the amount of track deviation. If this procedure is practiced, there is a disadvantage in that no complete erasure is obtained if a plurality of erasing operations is not executed on the same track, and in that such an erasing procedure would take much time.

Another disadvantage of the conventional apparatus is that when executing the erasure of a plurality of continuous tracks from the track position being accessed currently, the reproduced video signals on the first track can surely be monitored by the operator while the video signals on the subsequent tracks to be erased can not be monitored, resulting in mis-erasure, if continuous erasure is executed.

SUMMARY OF THE INVENTION

The primary object of this invention is to solve the technical problems of the conventional apparatus as described above.

Another object of this invention is to solve the problem of mis-erasure in the case of deviation of the absolute track position recorded from that reproduced, or in the case of different track widths in recording and in reproduction, and to enable the operator to monitor the video signals to be erased in continuous erasure of plural tracks, in order to propose an apparatus for recording and reproducing video signals in which mis-erasure can be prevented.

Under the foregoing objects, on of the embodiments of this invention is a recording and reproducing apparatus for recording and reproducing one field or a plurality of fields of recorded video signals on a predetermined track position in a disc-type recording medium, comprising erasing means for erasing recorded signals on a track, tracking fine control means for fine adjustment of a head arranged nearly opposite to the track, and erasure control means for executing a predetermined erasing operation to erase the recorded signals on the track on a basis of the head position after the tracking fine control means executes fine adjustment of tracking before executing erasure of video signals recorded on the track.

In this embodiment of this invention, the erasure control means controls the tracking means to execute the fine adjustment of tracking before erasing the recorded signals on the track in the disc-type recording medium, and it controls the erasing means to execute a predetermined erasing operation on a basis of the head position after the fine adjustment of tracking.

According to this invention, therefore, a good effect can be achieved in that complete erasure of video signals without mis-erasure can be obtained where the head position recording is deviated from that in reproduction, or in where the track width in recording is larger than that in reproduction, because the head position is finely adjusted by executing the fine control of tracking before execution of erasure in which a predetermined erasing operation is performed on a basis of the deviated head position.

Further, this invention enables tracking fine control in erasure and display of reproduced video signals for about one second for instance on a monitoring unit, so that the following video signals to be erased can be monitored securely, ensuring error-free erasure.

Further objects other than the foregoing ones and their features of this invention will become apparent from the following detailed description in conjunction with the accompanying drawings.

BRIEF DESCRIPTION OF THE DRAWINGS

FIG. 3 is a time chart illustrating the signal timing in the recording operation of an example of the embodiment of this invention.

FIG. 4 is a time chart illustrating the signal timing in the auto-tracking as arranged as an example of the embodiment of this invention.

FIG. 7 is a flow chart illustrating a sequence of erasing operation of another embodiment of this invention.

DETAILED DESCRIPTION OF THE PREFERRED EMBODIMENTS

Figure 1:
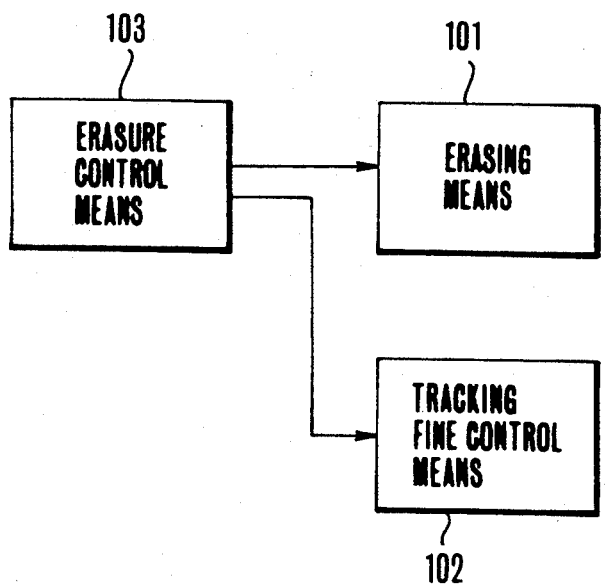
FIG. 1 is a block diagram of the basic configuration as arranged as an example of the preferred embodiment of this invention.

The preferred embodiments of this invention will be described in detail referring to the drawings.

A: BASIC CONFIGURATION

FIG. 1 shows a basic configuration of the preferred embodiment of this invention. In this figure, 101 is erasing means for erasing the recorded signals on a track in a disc-type recording medium, 102 is tracking fine control means for performing the auto-tracking to move the recording and/or reproducing head to a position in which the signal recorded on the track is reproduced at its maximum level by the recording and/pr reproducing head, and 103 is erasure control means which causes the tracking fine control means 102 to execute auto-tracking before execution of erasure of the recorded signals on the track and to move the head in the directions of the inner and outer circumference of the track relative to their center which is the head position after the auto-tracking, in order to cause the erasing means 101 to execute a plurality of erasures.

B: CIRCUIT CONFIGURATION

Figure 2:
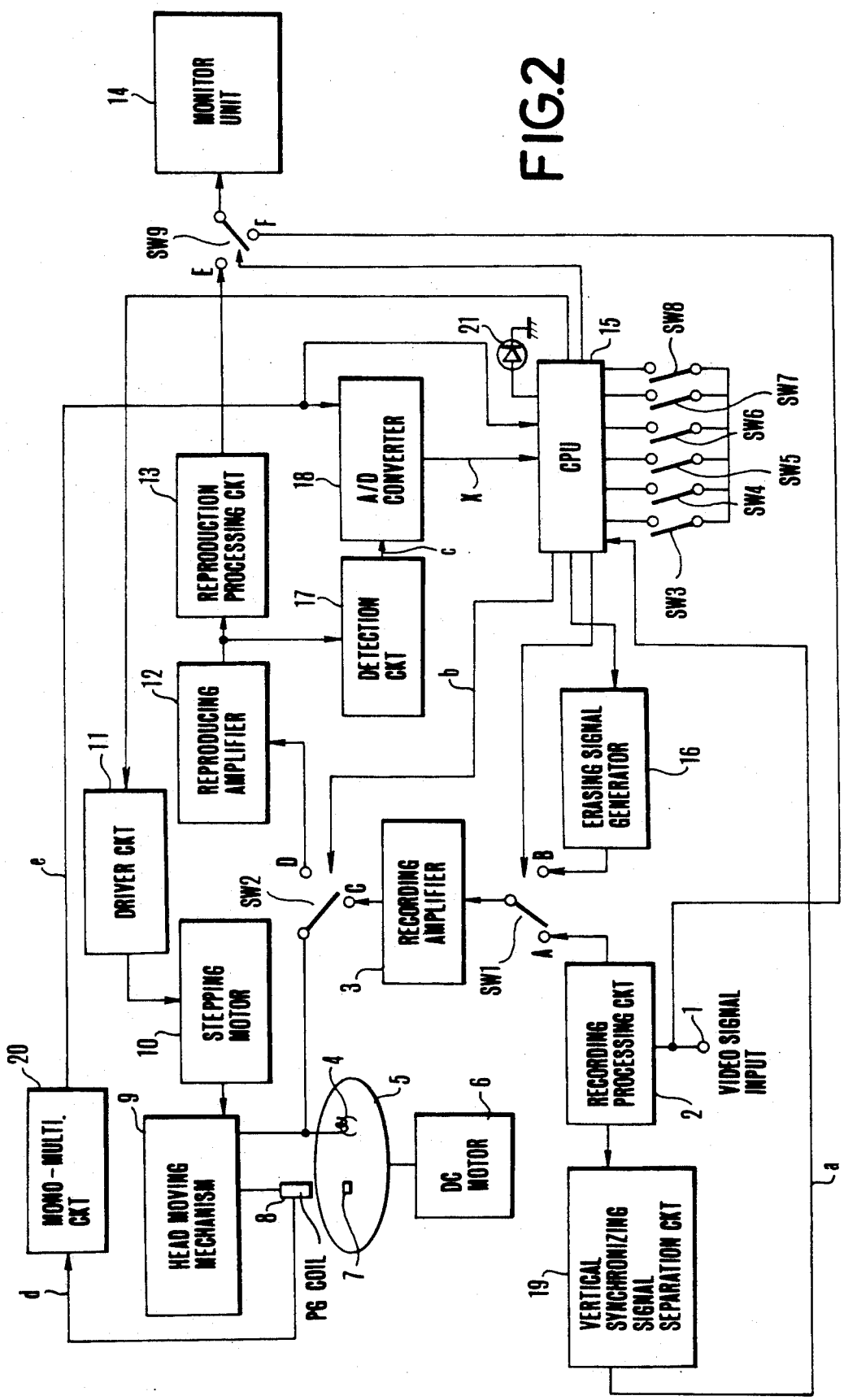
FIG. 2 is a block diagram of the circuit configuration as arranged as an example of the embodiment of this invention.

FIG. 2 shows a circuit configuration of preferred embodiment of this invention. In this figure, 1 is an input terminal for video signals, 2 a recording processing circuit for signal processing to record the video signals entered from the input terminal 1 in a magnetic sheet (magnetic disc sheet) as described below, and 3 a recording amplifier to amplify and record in the magnetic sheet the video signals entered through a switch SW1.

4 is a magnetic head, 5 a magnetic sheet as a rotary recording medium, 6 a DC (direct current) motor to rotate the magnetic sheet 5, 7 a magnetic element fitted on the magnetic sheet 5. 8 is a PG (pulse generator) coil comprising a rotary phase detector which generates one pulse excited by the magnetic element 7 per rotation of the magnetic sheet 5. 9 is a head moving mechanism to move the magnetic head 4 in the radial direction of the magnetic sheet 5, 10 a stepping motor to drive the head moving mechanism 9, and 11 a driver circuit to drive the stepping motor, which is controlled by a central processing unit (hereinafter called "CPU") as described below.

12 is a reproducing amplifier to amplify the reproduced signals that are reproduced from the magnetic sheet 5 and fed through the switch SW2 into the amplifier. 13 is a reproduction processing circuit to process the reproduction of the video signals that are demodulated from the output signals of the reproducing amplifier 12 and fed into this circuit.

14 is a monitoring unit to display on its screen the video signals fed through a switch SW9, 15 the CPU (central processing unit) to control the entire system by the control sequence incorporated in it on which the switches SW1, SW2 and SW9 are controlled for switching, and 16 an erasing signal generator to generate an erasing signal which erases the video signals recorded on the magnetic sheet 5 in accordance with the control signals from the CPU 15. 17 is a detection circuit to detect the envelope of the output signals from the reproducing amplifier 12, and 18 an A/D converter to convert the output signal from the detection circuit 17 in its analog form into the digital signal. The digital output of the A/D converter 18 is fed into the CPU 15. 19 is a vertical synchronizing signal separation circuit (Vsepa circuit) at which a vertical synchronizing signal is separated from the video signal fed into the video signal input terminal 1, and the separated signal is fed into the CPU 15. 20 is a mono-multi circuit which is triggered by the output signal from the PG coil 8 to feed the sampling pulses for A/D conversion to the A/D converter 18. 21 is an LED (light emitting diode) to display the erasing mode.

The switches SW3 through SW8 connected to the CPU 15 are the manual switches for setting the system operation modes relating to this invention. SW3 is a switch for setting the recording mode, SW4 for executing the recording mode, SW5 for executing the reproducing mode, SW6 for setting the erasing mode, SW7 for executing the erasing mode, and SW8 for setting the continuous mode.

C: RECORDING MODE

First, an example of operation for recording the video signals in the magnetic sheet 5 will be described.

When video signals are fed into the video signal input terminal 1, the operator sets the switch SW3 for setting the recording mode to ON. Then, the CPU 15 connects the switch SW1 to a contact A, the switch SW2 to another contact D, and the switch SW9 to another contact F. Then the video signals fed into the video signal input terminal 1 are fed through the switch SW9 into the monitoring unit 14 that displays them on its screen.

Then, when the operator sets the switch SW4 for executing the recording mode to ON, the CPU 15 connects the switch SW2 to a contact C, and the video signals entered from the video signal input terminal 1 are recorded on the magnetic sheet 5 through the switch SW2 and the magnetic head 4. The control timing in the execution of recording is designed to record one field of video signals on one track on the magnetic sheet 5 per rotation of the magnetic sheet 5. The timing signal for this control is given by the CPU 15 in a certain phase relation with the vertical synchronizing signal separated from the input video signals at the Vsepa circuit 19.

The timing of the signal waveform is shown in FIG. 3. In FIG. 3, "a" is the vertical synchronizing signal given by the Vsepa circuit 19 and "b" is the timing signal for switch changeover that is given by the CPU 15 to the switch SW2. After the switch SW4 is turned on, one following field of video signals are recorded, as shown in FIG. 3. In other words, the switch SW2 is connected to the contact C by the timing signal "b" that is rising in about 7H (horizontal periods) before the fall time of the vertical synchronizing signal "a", and the video signals that are given from the video signal input terminal 1 at this timing and processed at the recording processing circuit 2 are supplied to the recording amplifier 3, at which they are amplified, then fed to the magnetic head 4 through the switch SW2, and recorded by the magnetic head 4 on the track in the magnetic sheet 5.

D. REPRODUCING MODE

Next, an example of operation in the reproducing mode will be described below.

When the operator sets the switch SW5 for execution of the reproducing mode to ON, the CPU 15 connects the switch SW2 to the contact D and the switch SW9 to the contact E. By so doing, the signals that are reproduced from the magnetic sheet 5 by the magnetic head 4 are given through the switch SW2 to the reproducing amplifier 12 at which they are amplified, then fed into the reproduction processing circuit 13. The reproduced signals are processed at the reproduction processing circuit 13 to be demodulated into the video signals which are supplied through the switch SW9 to the monitoring unit 14 and displayed on its screen.

In the reproduction, the levels of the signals to be reproduced by the magnetic head 4 fall, deteriorating the signal-to-noise ratio of the reproduced video signals if the track position in recording deviates from that in reproduction. To avoid this difficulty, the procedure so-called auto-tracking to make the magnetic head 4 to access to the position in which the maximum reproduced signals are given will be described below.

The track recording the video signals is formed on the magnetic sheet 5 at 100 μm pitches (the track width of 60 m and the guard band of 40 μm). The head moving mechanism 9 to move the magnetic head 4 from a track to an adjacent track consists of a stepping move mechanism driven by the stepping motor 10. The relation of the head moving mechanism 9 to the stepping motor 10 is predetermined to accomplish the head's move over the distance of 100 μm in 12 steps.

When the reproducing mode is set by switching the switch SW5 through the CPU 15, the reproduced signals are amplified at the reproducing amplifier 12 and detected at the detection circuit 17. In FIG. 4, "c" is an example of the output waveform from the envelope detection circuit 17. In FIG. 4, the rotary phase detection pulses "d" are given from the magnetic element 7 and the PG coil 8, and converted into the signal pulses "e" by the mono-multi circuit 20. In synchronization with the signal pulses "e", the output signal "c" from the detection circuit 17 are sampled by the A/D converter 18 and converted from the analog to the digital signals. The A/D-converted digital signals X are fed into the CPU 15.

Now, the auto-tracking control by the CPU 15 will be described in reference to the flow chart in FIG. 5.

First, M is set to 0 (M=0)—step S1, and the A/D-converted value $X_1$ sampled at the output timing of the rotary phase detection pulses "e" in FIG. 4 is fed into the CPU 15—step S2, and retained in its internal memory—step S3. Then, the stepping motor 10 is driven to rotate by one step so that the magnetic head 4 is moved toward the inner circumference of the magnetic sheet 5—step S4. This operation is called one step-up hereinafter. Then, the A/D-converted value $X_2$ that is sampled at the output timing of the rotary phase detection pulses "e" in FIG. 4 is fed into the CPU 15—step S5. The stored value $X_1$ in the memory is compared with the input value $X_2$, and it is determined if $X_2 \geq X_1$ is or not—step S6. If $X_2 \geq X_1$, it means that the magnetic head 4 is approaching to the center of the track on the magnetic sheet 5. Then, M is set to 1 (M=1)—step S7, and the procedure is returned to step S3 to repeat the processing in step S3 through step S6.

When the magnetic head 4 passes over the track's center on the magnetic sheet 5, it becomes $X_2 < X_1$, from which it is determined that the peak is passed over. Then, it is determined if M=1 or not—step S8. If M=1, it means that the magnetic head 4 has been approaching to the track's center. Therefore, the magnetic head 4 is moved back toward the outer circumference by one step through the stepping motor 10—step S9. The position to which the magnetic head 4 is moved back is deemed to be the track's center. Thus, the control procedure is finished. The move-back operation is called one step-down hereinafter.

On the other hand, if the judgement of $X_2 \geq X_1$ in step S6 as described above is negative, it means that the magnetic head 4 deviates from the track's center on the magnetic sheet 5, add that M remains 0 (M=0). Thus, the judgement of M=1 in step S8 is negative, and the input value $X_2$ as mentioned above is stored in the internal memory—step S10. Then, the magnetic head 4 is returned by one step toward the outer circumference of the magnetic sheet 5—step S11. Subsequently, the A/D-converted value $X_3$ is fed into the CPU 15—step S12. The input value $X_3$ is compared with the stored value $X_2$ to determine if $X_3 \geq X_2$ or not—step S13. The normal condition is $X_3 \geq X_2$, so that the magnetic head 4 is approaching to the track's center on the magnetic sheet 5. Then, M is set to 1 (M=1)—step S14, and the procedure is returned to step S10 and the operations in step S10 through step S14 are repeated. Meanwhile, the magnetic head 4 passes over the track's center until it becomes $X_3 < X_2$. Then, the procedure runs from step S13 to step S15, where it is determined if M=1 or not. In this case, it is M=1 and the judgement is positive. Therefore, the magnetic head 4 is moved by one step toward the inner circumference of the magnetic sheet 5. That position of the magnetic head 4 is nearly the track's center. Thus, this control procedure is finished.

On the other hand, if the first comparison of the A/D-converted values $X_3$ and $X_2$ leads to the judgement of $X_3 < X_2$, it is considered that some anomaly has occurred in data detection. Then, the judgement if M=1 or not in step S15 is negative, so that the procedure returns to step S3, and the sequence as described above is repeated.

As described above, the CPU 15 controls the position of the magnetic head 4 in the reproducing mode in order to hold the levels of the reproduced signals at their maximum.

E: ONE-TRACK ERASING MODE

The operation in the erasing mode will be described in reference to the flow chart in FIG. 7, taking an example of operation.

For instance, in the reproducing mode after the auto-tracking as described above is executed, the erasing mode is set by the operator's turning on the erasing mode setting switch SW6—step S21. The state that the erasing mode has been set is notified the operator by the LED (light emitting diode) 21 that is then lighted—step S22. When the operator sets the switch SW7 for execution of erasure to ON—step S26, the erasure of the recorded information on the track in the magnetic sheet 5 is executed.

Figure 6:
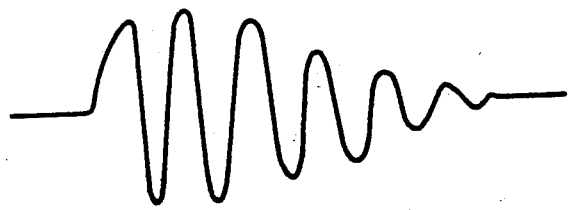
FIG. 6 is a waveform diagram illustrating a waveform of the erasing signal arranged for the embodiment of this invention.

Further, this operation will be described in detail. When the erasing switch SW7 is set to ON as described above, the CPU 15 connects the switch SW1 to the contact B, and the switch SW2 to the contact C—step S28. Then, when the CPU 15 feeds an erasing start signal to the erasing signal generator 16, an erasing signal which is an attenuation signal as shown in FIG. 6 is generated at the erasing signal generator 16 (whose oscillating time is approximately one second), and fed to the recording amplifier 3 and the switch SW2. Through these, the erasing signal is recorded on the magnetic sheet 5 by the magnetic head 4. The video signals on the track are erased by the erasing signal.

In this case, before the erasure is executed, namely before the CPU 15 gives the erasing start signal to the erasing signal generator 16, the CPU 15 drives the driver circuit 11 so that the stepping motor 10 and the head moving mechanism 9 moves the magnetic head 4 by one step of the stepping motor 10 in the step-up direction (toward the inner circumference of the magnetic sheet 5)—step S29. Then, the erasing signal generator 16 starts generating the erasing signal—step S30.

When the predetermined attenuation of the erasing signal has finished, the CPU 15 drives the driver circuit 11 to move the magnetic head 4 by 2 steps in the step-down direction toward the outer circumference of the magnetic sheet 5)—step S31. Then, the erasing signal generator 16 generates the erasing signal for a predetermined time to execute the erasure—step S32.

Next, the CPU 15 drives the driver circuit 11 again, in order to move the magnetic head 4 by one step in the step-up direction as described previously—step S33. Thus, the magnetic head 4 is returned to the original track position, and all the erasing sequence is finished.

Figure 5:
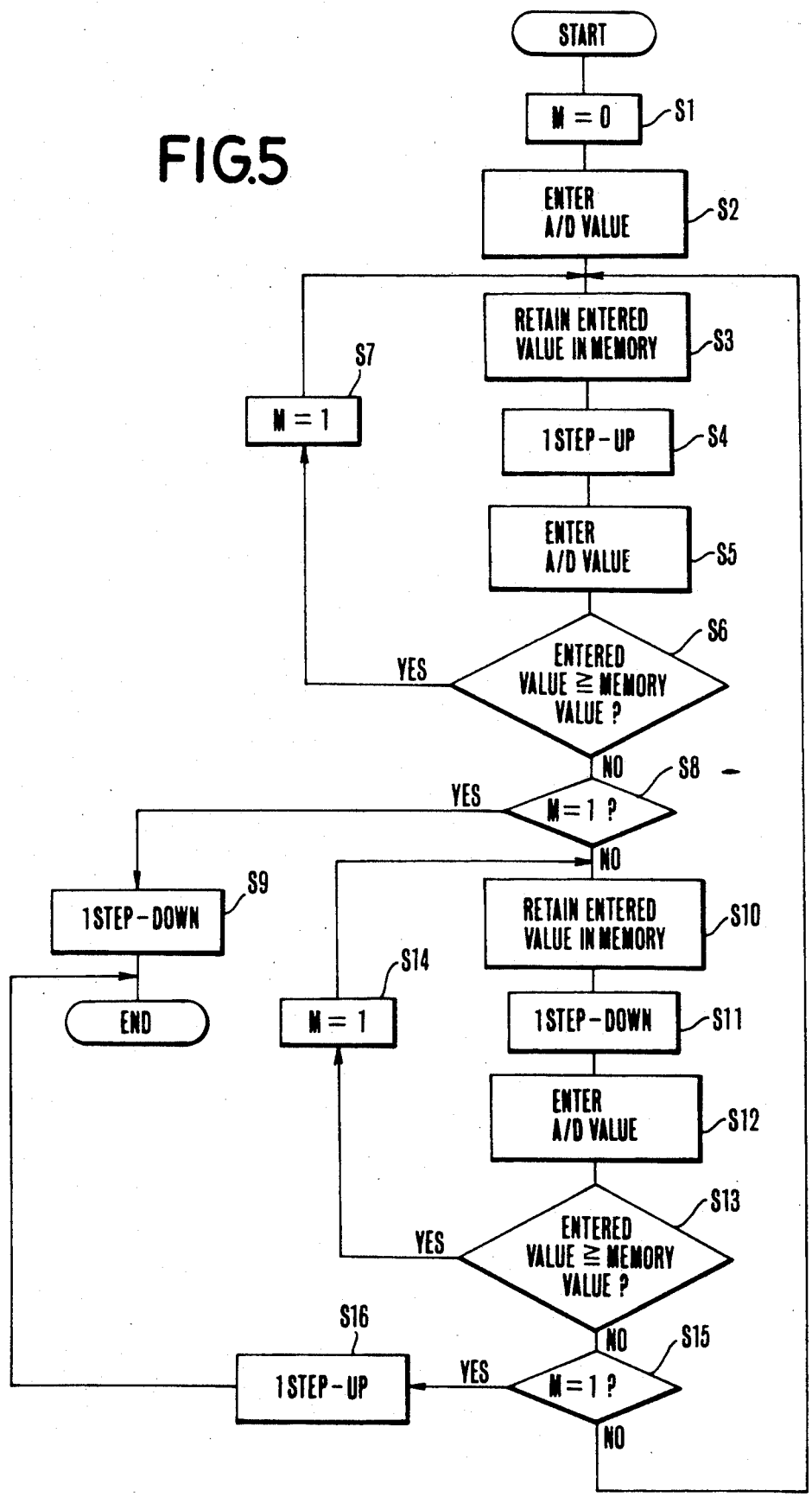
FIG. 5 is a flow chart illustrating the control operations of auto-tracking.

In executing the erasure in the reproducing mode, the auto-tracking as shown in FIG. 5 has been performed (The erasure is always executed after the auto-tracking has been performed in the reproducing mode. If the apparatus comes into an erasing standby state in the recording mode, operations in steps S24 and S25 are effected.), so that the position of the magnetic head 4 is set in almost the same position as in the recording mode. Because the magnetic head 4 is moved one step each before and after its set position in order to execute two erasing operations, the video signals recorded on the track in the magnetic sheet 5 can be completely erased without any deviation between the position of the magnetic head 4 in recording and that in reproduction. Further, if the track width formed by the magnetic head 4 in recording is different from that in reproduction, for instance if the track width in recording is larger than that in reproduction, the erasure can be performed perfectly without mis-erasure.

F: CONTINUOUS ERASING MODE

Now, an example of operation for continuous erasure in which the video signals recorded on the magnetic sheet 5 continuously will be described below.

In the case that the reproducing mode is retained as before, the auto-tracking has been performed as shown in FIG. 5. Then, when the erasing mode setting switch SW6 in FIG. 2 is set to ON—step S21 and the continuous mode setting switch SW8 is set to ON—step S34, the continuous erasing mode is set. When the erasing execution switch SW7 is set to ON in this condition—step S35, the following erasing procedure is executed on the continuous tracks in the magnetic sheet 5.

First, the operation of the sub-routine for one-track erasure as shown by a dotted line TE in FIG. 7 is performed as described in paragraph E above—step S36. Then, the CPU 15 connects the switch SW2 to the contact D and the switch SW9 to the contact E—step S37. The CPU 15 drives the driver circuit 11 to rotate the stepping motor 10 and to move the magnetic head 4 by 12 steps of the stepping motor 10 in the step-up direction through the head moving mechanism 9—step S38. As mentioned above, one track consists of 12 steps. Thus, the magnetic head 4 is moved by one track toward the inner circumference of the magnetic sheet 5 and the auto-tracking operation as shown in FIG. 5 is performed—step S39, in order that the magnetic head 4 can be set in the position where the reproduced output becomes its maximum. Then, this condition is retained for instance for one second or so—step S40, and the CPU 15 connects the switch SW2 to the contact C again, so that the same one-track erasing operation as in step S36 described above is performed—step S42.

These operating sequence shown in steps S37 through S42 is repeated until the magnetic head 4 finishes the erasure of the most inner track—step S43. However, if the erasing mode setting switch SW6 is set to OFF during the above-mentioned continuous erasure—step S41, the continuous erasure comes to stop. In the continuous erasure, the operator can also monitor the video signals to be erased because the video signals to be erased are displayed on the monitoring unit 14 for about one second by auto-tracking before the execution of erasure—step S40. For example, if the video signals that the operator does not want to erase are displayed on the monitoring unit 14, the continuous erasure can be stopped by setting the switch SW6 to OFF—step S41, thus preventing mis-erasure.

In the case that the recording mode is held before entering the erasing mode, and that the erasing mode setting switch SW6 is set to ON in order to enter the erasing mode—step S21, this condition is discriminated in step S23 and the CPU 15 connects the switch SW2 to the contact D and the switch SW9 to the contact E—step S24. Then, the above-mentioned auto-tracking is performed—step S25, and the preparation for erasure is finished. Then, when the switch SW7 is set to ON—step S26, the one-track erasure as described above can be performed perfectly—step S28 through step S33, while the complete erasure in the continuous stepped erasure mode becomes possible—steps S36—S43, by setting the switch SW8 to ON and then the switch SW7 to ON—steps S34 and S35.

The moved amount of the magnetic head 4 that moves by one step of the stepping motor 10 is not limited to 100/12 μm, but it can be a larger value in dependence on the error of the track position and the error of the track width estimated based on the experimental values of those constructual design and experience.

If the moved amount of the magnetic head 4 that moves by one step of the stepping motor 10 is smaller than the error of the track position and the error of the track width as estimated, the track moving amount in execution of erasure should be a larger value than two steps or more.

Figure 8:
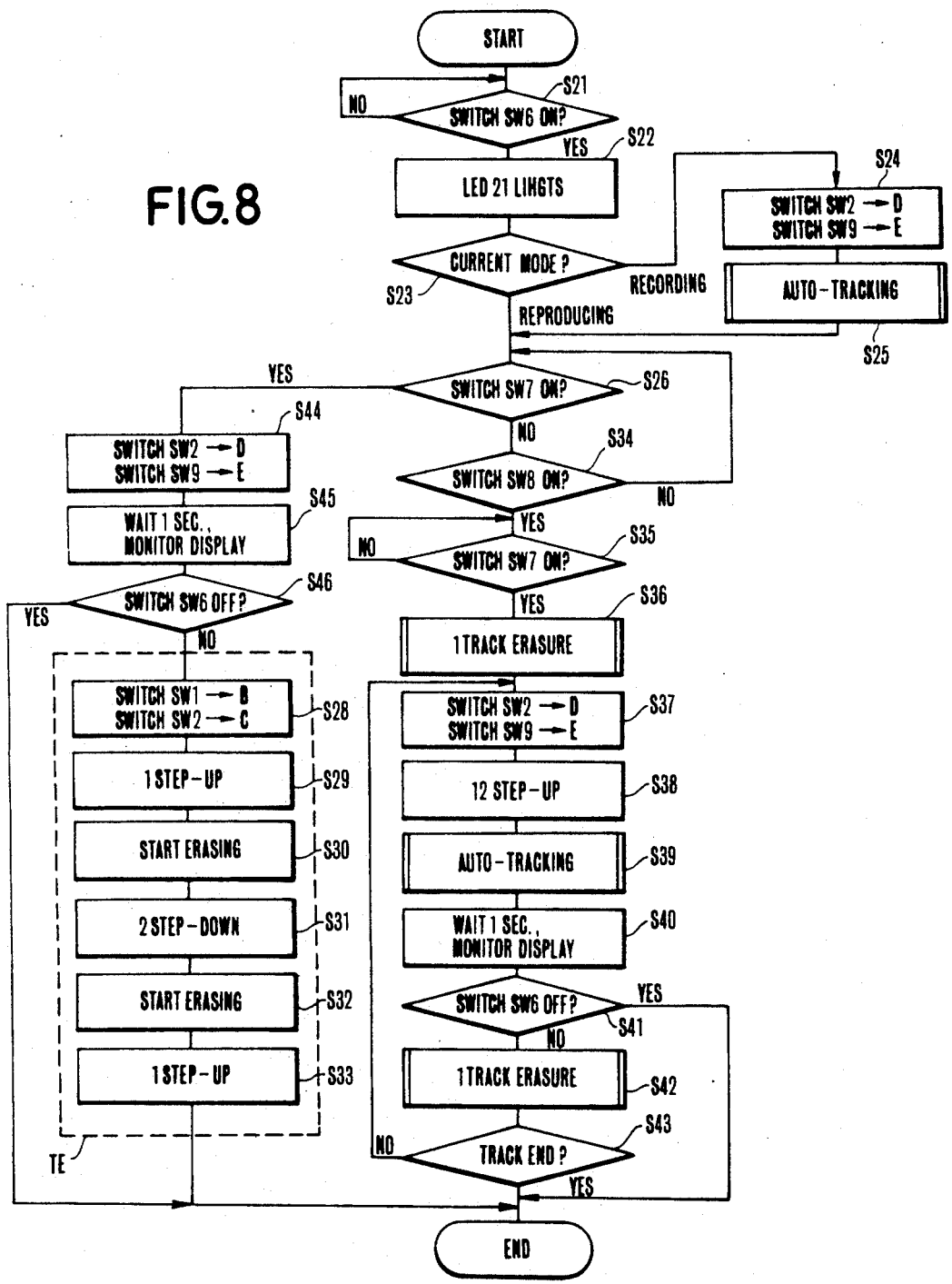
FIG. 8 is a flow chart illustrating another sequence of erasing operation of the embodiment of this invention.

The time of displaying the reproduced video signals on the monitor in the continuous erasure execution is not limited to one second as described for the embodiment of this invention, but it can be any time which the operator can fully monitor the video signals, for example, several minutes. This invention covers another embodiment in which the reproducing mode is automatically set for a predetermined time in the one-track erasure as shown in FIG. 8. In other words, when the step S26 is YES, the switch SW2 is connected to the contact D and the switch to E in step S44, and the signals to be erased on the track are reproduced once for about one second—step S45. Then, it is determined if the switch SW6 is set to OFF or not. If the switch SW6 is not OFF, the sequence proceeds to step S28. If the switch SW6 is set to OFF, the erasing operation can be stopped. Further, the disc as the recording medium is not limited to a magnetic medium.

As described above, this invention has an advantage in that the erasure can be executed perfectly without mis-erasure when the head position in recording deviates from that in reproduction, and when the track width in recording is larger than that in reproduction, because the tracking fine control is executed to adjust the head position finely before a predetermined erasing operation is performed on a basis of the moved position of the head.

In this invention, further, tracking fine control is executed before erasing and the reproduced video signals for about one second to several minutes for instance are displayed on the monitor during erasing operation, so that the following video signals to be erased can be monitored securely in order to execute error-free erasing operations.

What is claimed is:

1. A recording and/or reproducing apparatus for recording signals on and/or reproducing signals from a plurality of areas on a recording medium, comprising;
   (a) erasing means supported for movement in said apparatus and operable for erasing signals recorded in said plurality of areas:
   (b) erasure control means having a first erasing mode for operating said erasing means for erasing only the area at which said erasing means is positioned and a second erasing mode for operating said erasing means for erasing a plurality of areas by sequentially moving said erasing means in a predetermined direction for the area where said erasing means is positioned to other areas, said erasure control means being arranged, in said second erasing mode, to effect an auto-tracking operation and a reproducing operation for reproducing the area to be erased for a predetermined time, prior to erasing each area;
   (c) erasing mode selecting means for selecting said first erasing mode or said second erasing mode of said erasing means; and
   (d) manually erasing operating means for effecting continuous erasing operation in said second erasing mode only during operating period of said manually erasing operating means when said second erasing mode has been selected by said erasing mode selecting means.

2. An apparatus according to claim 1, wherein said recording medium is of disc type, and said plurality of areas are recording tracks recorded on said disc and arranged in respective concentric circles.

3. An apparatus according to claim 1, which is arranged to magnetically record signals on and/or reproduce signals from said recording medium.

4. An apparatus according to claim 3, further comprising:
   a magnetic head for magnetically recording signals on and/or reproducing signals from said recording medium.

5. An apparatus according to claim 4, wherein said erasing means includes a magnetic head.

6. An apparatus according to claim 1, further comprising:
   triggering means for operating said erasure control means to execute an erasing operation of the area or areas on said recording medium.

7. An apparatus according to claim 1, further comprising:
   reproducing means for reproducing a signal recorded in an area to be erased by said erasing means prior to execution of such erasing operation.

8. An apparatus according to claim 7, wherein said reproducing means is arranged to reproduce and display such recorded signal to be erased for a predetermined time.

9. An apparatus according to claim 1, further comprising:
   adjusting means for effecting fine adjustment of the positional relation between said erasing means and said area to be erased prior to execution of such erasing operation.

10. An apparatus according to claim 9, wherein said adjusting means is arranged to detect a signal level in such area to be erased and to effect such positional adjustment depending upon said signal level.

11. A recording and/or reproducing apparatus for recording signals in and/or reproducing signals from a plurality of recording tracks on a recording disc, comprising:
    (a) erasing means for erasing signals recorded in said tracks on said recording disc,
    (b) erasing head moving means for moving said erasing means to said plurality of tracks,
    (c) control means for operating said erasing means initially to erase signals in a track in registry with said erasing means and to then operate said moving means to move said erasing means into registry with tracks successively adjacent such erased track and to operate said erasing means upon each such registering movement thereof, thereby enabling said erasing means to automatically erase signals in a succession of tracks:
    (d) reproducing means arranged to effect an auto-tracking operation and a reproducing operation of the track for a predetermined time prior to erasing each track when the plurality of tracks are successively erased by operating said erasing means; and
    (e) manually erasing operation means enabling continuous erasing operation of a plurality of recording tracks by said control means only during operation of said manually erasing operation means.

12. An apparatus according to claim 11, wherein said disc is a magnetic disc and said apparatus has a magnetic head arranged to magnetically record signals in and/or reproduce signals from said disc.

13. An apparatus according to claim 12, wherein said erasing means includes a magnetic head.

14. An apparatus according to claim 11, further comprising:
    reproducing means for reproducing signals in a track to be erased by said erasing means prior to execution of such erasing operation.

15. An apparatus according to claim 8, wherein said reproducing means is arranged to reproduce and display signals in a track to be erased for a predetermined time.

16. An apparatus according to claim 11, further comprising:
    adjusting means for effecting fine adjustment of the positional relation between said erasing means and said track to be erased prior to execution of such erasing operation.

17. An apparatus according to claim 16, wherein said adjusting means is arranged to detect a signal level of said track to be erased and effect such positional adjustment depending upon said signal level.

18. An apparatus according to claim 11, further comprising:
    means for terminating the operation of said control means in any desired track before said erasing means reaches the final track in such succession of tracks.

19. An erasing apparatus for erasing any recording tracks of plural tracks arranged in respective concentric circles on a magnetic disc, comprising:
    (a) erasing means including an erasing head and an erasing circuit for feeding an erasing current to said erasing head;
    (b) a head moving mechanism for moving the erasing head in a radial direction to any desired track on said disc;

(c) starting means for operating said erasing circuit to feed the erasing current to said erasing head, thereby starting the erasing operation;

(d) detecting means for detecting that said erasing head has reached a final track in such arrangement;

(e) control means for operating said head moving mechanism to move said erasing head for a distance of one track each time a track has been erased by said erasing head depending upon the operation of said starting means and for stopping such erasing operation when a final track has been detected by said detecting means, said control means being arranged to effect an auto-tracking operation and a reproducing operation of the track for a predetermined time prior to erasing each track by said erasing head; and (f) manually erasing operating means for preferentially operating said control means only during operating periods of said manually erasing operating means, thereby enabling the continuous erasure of said plurality of tracks.

* * * * *